(12) United States Patent
Benjamin et al.

(10) Patent No.: US 12,077,304 B2
(45) Date of Patent: Sep. 3, 2024

(54) UNIVERSAL SEQUENCER AND WIRE HARNESS ASSEMBLY FOR EJECTION SYSTEMS

(71) Applicant: AMI Industries, Inc., Colorado Springs, CO (US)

(72) Inventors: Jeff Benjamin, Colorado Springs, CO (US); Steve Bredl, Colorado Springs, CO (US)

(73) Assignee: AMI INDUSTRIES, INC., Colorado Springs, CO (US)

( * ) Notice: Subject to any disclaimer, the term of this patent is extended or adjusted under 35 U.S.C. 154(b) by 1264 days.

(21) Appl. No.: 16/415,863

(22) Filed: May 17, 2019

(65) Prior Publication Data

US 2020/0361614 A1    Nov. 19, 2020

(51) Int. Cl.
*B64D 25/10* (2006.01)
*B64D 17/72* (2006.01)
*G05B 19/042* (2006.01)

(52) U.S. Cl.
CPC .......... *B64D 25/10* (2013.01); *B64D 17/725* (2013.01); *G05B 19/0426* (2013.01)

(58) Field of Classification Search
None
See application file for complete search history.

(56) References Cited

U.S. PATENT DOCUMENTS

| | | | |
|---|---|---|---|
| 3,027,126 A | 3/1962 | Wallace | |
| 4,057,206 A * | 11/1977 | Duncan | B64D 25/10 73/204.19 |
| 4,527,758 A | 7/1985 | Ayoub et al. | |
| 4,673,147 A | 6/1987 | Solomonides | |
| 4,699,336 A * | 10/1987 | Diamond | B64C 1/32 244/140 |
| 4,706,909 A | 11/1987 | Cuevas et al. | |
| 4,721,273 A | 1/1988 | Trikha | |
| 4,723,613 A * | 2/1988 | Garlen | G01G 23/163 177/164 |
| 4,846,421 A * | 7/1989 | Trikha | B64D 25/10 244/141 |

(Continued)

FOREIGN PATENT DOCUMENTS

| | | |
|---|---|---|
| EP | 0354276 | 2/1990 |
| EP | 0480733 | 4/1992 |

(Continued)

OTHER PUBLICATIONS

European Patent Office, European Search Report dated Jul. 15, 2020 in Application No. 19213942.6.

*Primary Examiner* — Jennifer L Norton
(74) *Attorney, Agent, or Firm* — SNELL & WILMER L.L.P.

(57) ABSTRACT

A universal sequencer for an ejection seat may comprise a connector defining a plurality of pin receptacles. A controller may be electrically coupled to the connector. A tangible, non-transitory may be memory configured to communicate with the controller. The tangible, non-transitory memory has instructions stored thereon that, in response to execution by the controller, cause the controller to perform operations, which may comprise determining an ejection seat or aircraft model and determining an ejection sequence based on the ejection seat or aircraft model determination.

10 Claims, 4 Drawing Sheets

(56) References Cited

U.S. PATENT DOCUMENTS

| | | | | |
|---|---|---|---|---|
| 5,356,097 | A * | 10/1994 | Chalupa | B64D 25/12 |
| | | | | 244/139 |
| 5,362,016 | A * | 11/1994 | Aronne | B64D 17/58 |
| | | | | 244/122 AE |
| 5,524,362 | A * | 6/1996 | Quandt | D06F 34/28 |
| | | | | 34/526 |
| 5,525,847 | A | 6/1996 | Aronne | |
| 6,923,285 | B1 * | 8/2005 | Rossow | E02F 3/431 |
| | | | | 701/50 |
| 11,390,389 | B2 * | 7/2022 | Dunst | G05B 19/0428 |
| 11,505,325 | B2 * | 11/2022 | McCumber | B64C 19/00 |
| 11,548,649 | B2 * | 1/2023 | Hampton | B64D 25/10 |
| 11,608,183 | B2 * | 3/2023 | Wilson | B64D 25/10 |
| 2003/0105389 | A1 * | 6/2003 | Noonan | G16H 40/67 |
| | | | | 600/300 |
| 2010/0217441 | A1 * | 8/2010 | Eichman | G05B 19/0426 |
| | | | | 62/157 |
| 2018/0170558 | A1 * | 6/2018 | Sapija | B64D 45/00 |
| 2019/0135174 | A1 * | 5/2019 | Brown | B60Q 3/88 |
| 2020/0130852 | A1 * | 4/2020 | Marutzky | B64D 17/725 |
| 2023/0182907 | A1 * | 6/2023 | Holstine | B64D 25/10 |
| | | | | 244/122 AC |

FOREIGN PATENT DOCUMENTS

| | | | | |
|---|---|---|---|---|
| EP | 1159218 | A1 * | 12/2001 | B66B 1/34 |
| GB | 2120612 | | 12/1983 | |
| GB | 2505751 | A * | 3/2014 | G06F 1/26 |

* cited by examiner

UNIVERSAL SEQUENCER AND WIRE HARNESS ASSEMBLY FOR EJECTION SYSTEMS

FIELD

The present disclosure relates to ejection seats, and more specifically, to a universal sequencer and wire harness assembly for ejection systems.

BACKGROUND

Ejection seats are designed to expel pilots from an aircraft. Typical ejection seats include an ejection seat sequencer. The ejection seat sequencer may be configured to sense the airspeed and altitude of the seat at the beginning of the ejection event and sequence each of the seat's subsystems (e.g., parachute mortar, harness release thruster, etc.) at predetermined times. The timing of the subsystems can vary depending on the altitude, airspeed, and the type of ejection seat and/or aircraft. In this regard, ejection seats and aircraft are associated with a specific sequencer due to the ejection seat and/or aircraft specific timings and cable lengths.

SUMMARY

A universal sequencer for an ejection seat is disclosed herein. In accordance with various embodiments, the universal sequencer may comprise a sequencer connector defining a plurality of pin receptacles, a controller electrically coupled to the sequencer connector, and tangible, non-transitory memory may be configured to communicate with the controller. The tangible, non-transitory memory has instructions stored thereon that, in response to execution by the controller, cause the controller to perform operations that may comprise determining, by the controller, an ejection seat model and determining, by the controller, an ejection sequence based on the ejection seat model.

In various embodiments, determining the ejection sequence may further comprise implementing, by the controller, at least one of a first ejection timetable or a second ejection timetable different from the first ejection timetable. In various embodiments, the first ejection timetable may be configured to cause a parachute mortar to fire a first number of seconds after an initiation of the ejection sequence. The second ejection timetable may be configured to cause the parachute mortar to fire a second number of seconds after the initiation of the ejection sequence. The second number of seconds may be greater than the first number of seconds.

In various embodiments, the operations may further comprise determining, by the controller, an aircraft model.

In various embodiments, a power supply may be electrically coupled to the controller. In various embodiments, the operations may further comprise receiving, by the controller, a current from the power supply and outputting, by the controller, the current to the sequencer connector.

In various embodiments, determining the ejection seat model may further comprise determining, by the controller, which of the plurality of pin receptacles are in an open state and determining, by the controller, which of the plurality of pin receptacles are in a closed state.

An ejection seat is also disclosed herein. In accordance with various embodiments, the ejection seat may comprise a wire harness and a universal sequencer electrically coupled to the wire harness. The wire harness may include a harness connector and a plurality of electrical conduits electrically coupled to the harness connector. The harness connector may comprise a first pin configuration. The universal sequencer may comprise a sequencer connector engaged with the harness connector, a controller electrically coupled to the sequencer connector, and a tangible, non-transitory memory configured to communicate with the controller. The sequencer connector may include a plurality of pin receptacles. The tangible, non-transitory memory has instructions stored thereon that, in response to execution by the controller, cause the controller to perform operations, which may comprise determining, by the controller, at least one of an ejection seat model or an aircraft model based on the first pin configuration and determining, by the controller, an ejection sequence based on the at least one of the ejection seat model or the aircraft model.

In various embodiments, a parachute mortar may be electrically coupled to a first electrical conduit of the plurality of electrical conduits. A restraint release thruster may be electrically coupled to a second electrical conduit of the plurality of electrical conduits.

In various embodiments, determining the ejection sequence may further comprise implementing, by the controller, at least one of a first ejection timetable or a second ejection timetable different from the first ejection timetable.

In various embodiments, the first ejection timetable may be configured to cause the restraint release thruster to fire a first number of seconds after the parachute mortar is fired. The second ejection timetable may be configured to cause the restraint release thruster to fire a second number of seconds after the parachute mortar is fired. The second number of seconds may be greater than the first number of seconds.

In various embodiments, the ejection seat may further include an angular rate sensor.

In various embodiments, a power supply may be electrically coupled to the controller. In various embodiments, the operations may further comprise receiving, by the controller, a current from the power supply and outputting, by the controller, the current to the sequencer connector.

In various embodiments, determining the at least one of the ejection seat model or the aircraft model may further comprise determining, by the controller, which of the plurality of pin receptacles are in an open state and determining, by the controller, which of the plurality of pin receptacles are in a closed state.

An assembly is also disclosed herein. In accordance with various embodiments, the assembly may comprise a wire harness and a universal sequencer configured to electrically couple to the wire harness. The wire harness may include a harness connector and a plurality of electrical conduits electrically coupled to the harness connector. The harness connector may comprise a first pin configuration. The universal sequencer may comprise a sequencer connector configured to engage the harness connector, a controller electrically coupled to the sequencer connector; and a tangible, non-transitory memory configured to communicate with the controller. The sequencer connector may include a plurality of pin receptacles. The tangible, non-transitory memory has instructions stored thereon that, in response to execution by the controller, cause the controller to perform operations, which may comprise determining, by the controller, at least one of an ejection seat model or an aircraft model and determining, by the controller, an ejection sequence based on the at least one of the ejection seat model or the aircraft model.

In various embodiments, a power supply may be electrically coupled to the controller. In various embodiments, the operations further comprise receiving, by the controller, a current from the power supply and outputting, by the controller, the current to the sequencer connector.

In various embodiments, determining the at least one of the ejection seat model or the aircraft model may further comprise determining, by the controller, which of the plurality of pin receptacles are in an open state and determining, by the controller, which of the plurality of pin receptacles are in a closed state.

In various embodiments, determining the ejection sequence may further comprise implementing, by the controller, at least one of a first ejection timetable or a second ejection timetable different from the first ejection timetable.

In various embodiments, a first electrical conduit of the plurality of electrical conduits may be configured to fire a drogue parachute mortar. The first ejection timetable may be configured to cause the drogue parachute mortar to fire a first number of seconds after the controller receives the current from the power supply. The second ejection timetable may be configured to cause the drogue parachute mortar to fire a second number of seconds after the controller receives the current from the power supply. The second number of seconds may be greater than the first number of seconds.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Figure 1:
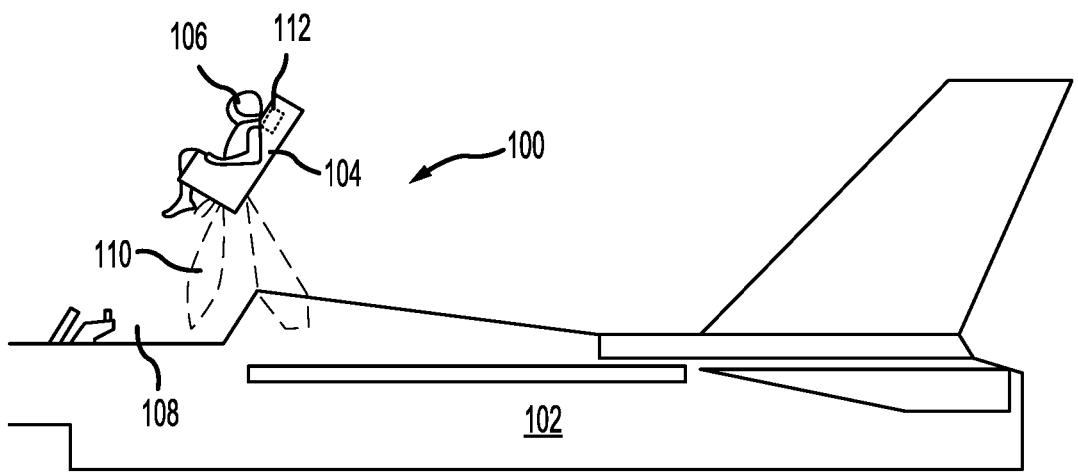
FIG. 1 illustrates an ejection seat being launched from an aircraft cockpit, in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

A universal ejection seat sequencer is disclosed herein. In accordance with various embodiments, the universal sequencer is programmed with the specific timing sequences for multiple ejection seats and aircrafts. The universal sequencer is configured to engage a wire harness located within an ejection seat. Upon initiation of an ejection sequence, the universal sequencer identifies the type of ejection seat and aircraft based on the connection to the wire harness. The controller then implements seat and aircraft specific timing instructions for the identified ejection seat and aircraft.

System program instructions and/or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. § 101.

A universal sequencer allows, in accordance with various embodiments, a single part to be purchased and employed in multiple ejection seats and aircraft. Reducing the number of unique parts associated with an ejection system tends to reduce costs. Additionally, the coupling between the universal sequencer and the wire harness allows the universal sequencer to be easily removed for replacement and/or testing. In this regard, the universal sequencer and the wire harness may be tested separately to ensure each component is working properly.

With reference to FIG. 1, an aircraft ejection system 100 is shown, in accordance with various embodiments. Aircraft ejection system 100 may be installed in aircraft 102 to safely expel an ejection seat 104 and an occupant 106 of ejection seat 104 from a cockpit 108 of aircraft 102. Ejection seat 104 may be urged from cockpit 108 by a propulsion system 110. Aircraft ejection system 100 may include a universal sequencer 112. Universal sequencer 112 may be located on or within ejection seat 104. As described in further detail below, universal sequencer 112 is configured to control the timing (i.e., sequence) of various subsystems of ejection seat 104 based on a determination of the particular models of ejection seat 104 and aircraft 102. In various embodiments, universal sequencer 112 may be compatible with multiple models of Advanced Concept Ejection Seats (ACES).

Figure 2:
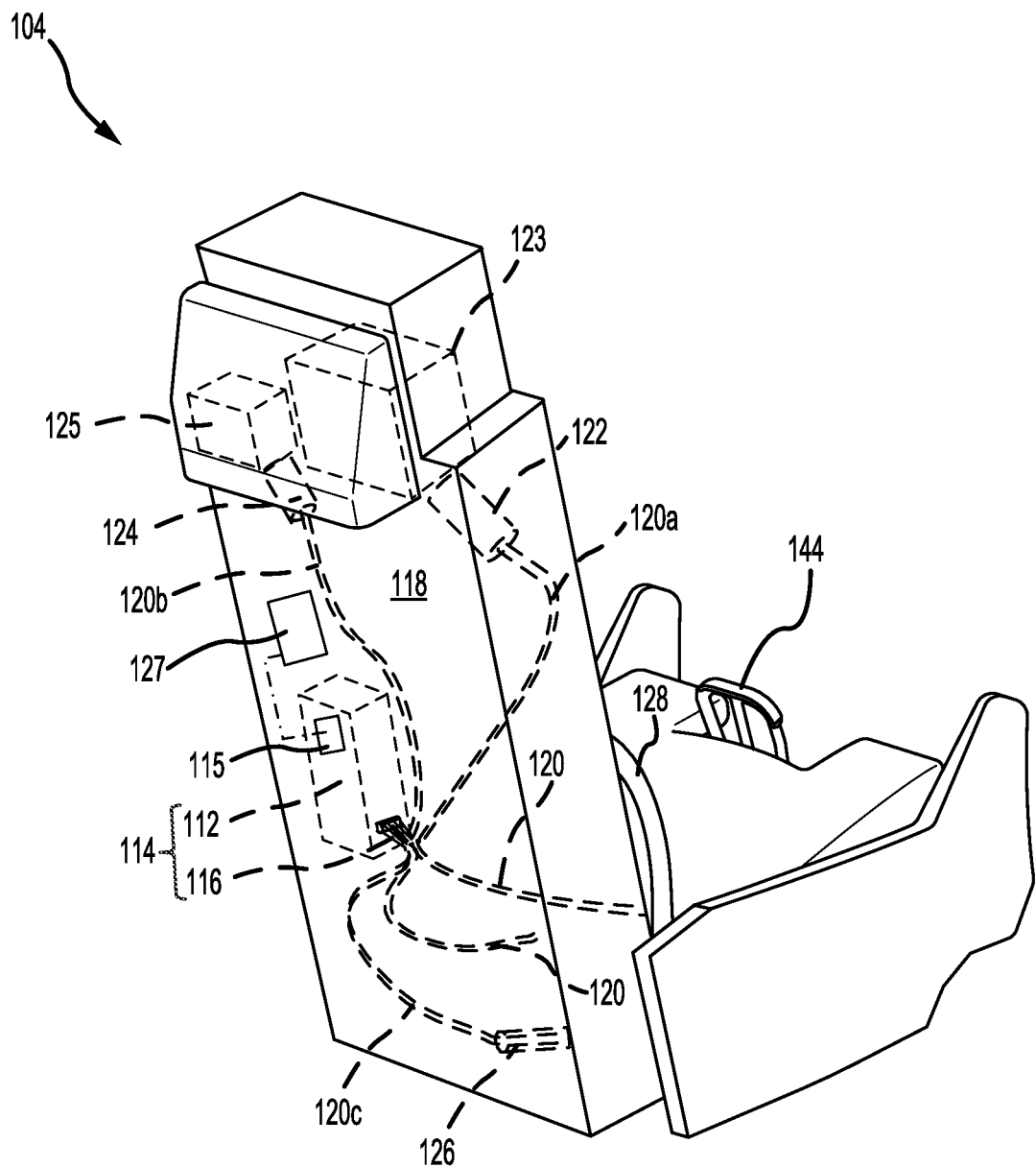
FIG. 2 illustrates a perspective view of an ejection seat including a universal sequencer and wire harness assembly, in accordance with various embodiments.

With reference to FIG. 2, ejection seat 104 is illustrated, in accordance with various embodiments. Ejection seat 104 includes a universal sequencer and wire harness assembly 114. Universal sequencer and wire harness assembly 114 includes universal sequencer 112 and a wire harness 116. Universal sequencer 112 and wire harness 116 may be located generally within a frame 118 of ejection seat 104.

In various embodiments, ejection seat 104 includes an angular rate sensor 127. Angular rate sensor 127 measures angular changes (e.g., in degrees or radians per second) of ejection seat 104 during an ejection event. For example, if after expulsion from cockpit 108, ejection seat 104 pitches forward, angular rate sensor 127 senses the rate of change in the angle of ejection seat 104. The angular rate of change data output from angular rate sensor 127 is received and stored within a data memory 115 of universal sequencer 112. During an accident or ejection seat malfunction investigation, the acceleration in angular rate data stored with data memory 115 of universal sequencer 112 may be collected and analyzed, upon recovery of ejection seat 104. The data may be used to better understand the forces acting upon ejection seat 104 during an ejection event.

Wire harness 116 includes a plurality of electrical conduits 120. Electrical conduits 120 may be electrically coupled to various ejection subsystems of ejection seat 104. For example, a first electrical conduit 120a of wire harness 116 may be operationally coupled to a parachute mortar 122 of ejection seat 104. In this regard, first electrical conduit 120a may be configured to fire parachute mortar 122. Stated differently, parachute mortar 122 may fire and deploy a parachute 123 from ejection seat 104 in response to receiving an electrical signal from first electrical conduit 120a. A second electrical conduit 120b of wire harness 116 may be operationally coupled to a drogue parachute mortar 124 of ejection seat 104. In this regard, second electrical conduit 120b may be configured to fire drogue parachute mortar 124. Stated differently, drogue parachute mortar 124 may fire and deploy a drogue parachute 125 from ejection seat 104 in response to receiving an electrical signal from second electrical conduit 120b. A third electrical conduit 120c of wire harness 116 may be operationally coupled to a restraint release thruster 126 of ejection seat 104. In this regard, third electrical conduit 120c may be configured to fire restraint release thruster 126. Stated differently, restraint release thruster 126 may fire and release occupant restraints 128 in response to receiving an electrical signal from third electrical conduit 120c. Parachute mortar 122, drogue parachute mortar 124, and restraint release thruster 126 are exemplary ejection subsystems, it is further contemplated and understood that universal sequencer and wire harness assemblies as disclosed herein may be employed in ejection seats having any number and/or combination of ejection subsystems.

Figure 3:
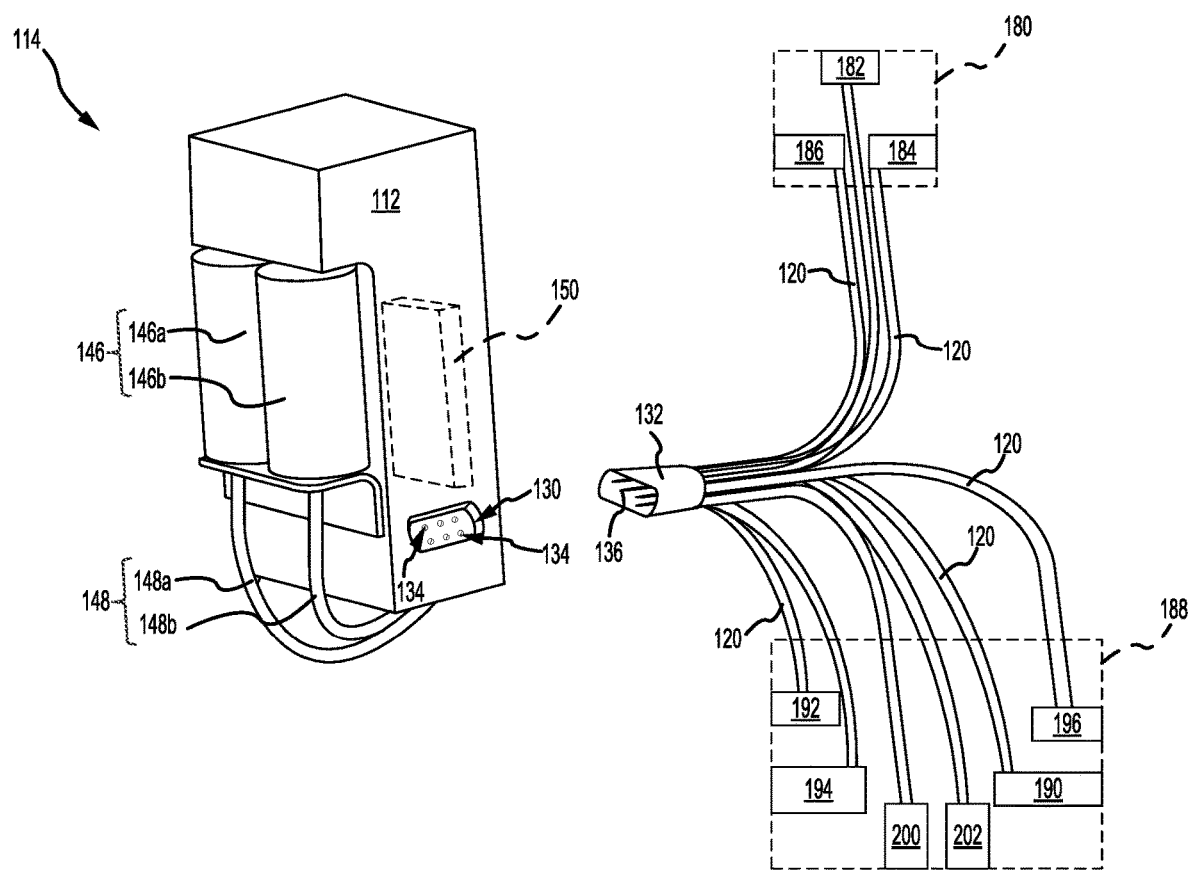
FIG. 3 illustrates a perspective view of a universal sequencer and wire harness assembly, in accordance with various embodiments.

Referring to FIG. 3, and with continued reference to FIG. 2, universal sequencer and wire harness assembly 114 is illustrated, in accordance with various embodiments. Wire harness 116 is configured to electrically couple to universal sequencer 112. Universal sequencer 112 includes a sequencer connector 130. Wire harness 116 includes a harness connector 132. Sequencer connector 130 is configured to engage harness connector 132, thereby electrically coupling electrical conduits 120 to universal sequencer 112. In various embodiments, sequencer connector 130 includes a plurality of pin receptacles 134. Stated differently, sequencer connector 130 defines pin receptacles 134. Harness connector 132 includes a plurality of pins 136. Pin receptacles 134 are configured to receive pins 136.

Pins 136 are arranged in a pin configuration. The configuration of pins 136 allows universal sequencer 112 to identify the model of the ejection seat and the model of the aircraft in which wire harness 116 is installed. In this regard, wire harness 116 is ejection seat specific. For example, a first model ejection seat may include a first wire harness having a first pin configuration and a different model ejection seat and/or an ejection seat installed in a different model aircraft may have a second wire harness having a different pin configuration. In accordance with various embodiments, universal sequencer 112 is compatible and may be employed with multiple wire harnesses with varying pin configurations.

In various embodiments, electrical conduits 120 of wire harness 116 may be electrically coupled to p-leads within various p-lead modules of ejection seat 104. For example, a first p-lead module 180 may include a drogue mortar p-lead 182, a first parachute mortar p-lead 184, and a second parachute mortar p-lead 186. A second p-lead module 188 may include a rocket motor and stability package (STAPAC) p-lead 190, a trajectory divergence thruster p-lead 192, a left drogue severance cutter p-lead 194, a right drogue severance cutter p-lead 196, a harness release thruster p-lead 198, and a sequencer start switch p-lead 200.

An ejection timetable including predetermined time delays for each of the p-leads within each of the first and second p-lead modules 180, 188 may vary between different models of ejection seats and/or between different models of aircraft. The ejection timetable for the p-leads within each of the first and second p-lead modules 180, 188 may also vary based on seat location. For example, the ejection timetable (i.e., time delays) for the p-leads in a forward ejection seat may be different from the ejection timetable (i.e., time delays) for the p-leads in a rear ejection seat. Universal sequencer 112 is programmed to recognize the model, aircraft, and seat location based on the configuration of pins 136 and employ the associated p-lead timetables. The ejection timetable may comprise any suitable time delays based on the properties of the ejection subsystems (i.e., the subsystems to which the p-leads are electrically coupled), the properties of ejection seat 104, the properties of aircraft 102, the altitude and/or the airspeed at the time of ejection, or any other desired properties.

In various embodiments, universal sequencer 112 may include a power supply 146. In various embodiments, power supply 146 comprises a primary power supply 146a and a secondary power supply 146b for redundancy should primary power supply 146a fail. Power supply 146 is configured to activate in response to ejection seat 104 being expelled from aircraft 102 (FIG. 1). For example, power supply 146 may activate in response to actuation of handle 144, with momentary reference to FIG. 2. Upon activation, power supply 146 provides electricity (e.g., current) to universal sequencer 112. In various embodiments, primary power supply 146a and secondary power supply 146b may each comprise a thermal battery configured to activate in response to expulsion of ejection seat 104. For example, expulsion of ejection seat 104 may cause a chemical reaction within the thermal battery. The chemical reaction generates electricity that is provided to universal sequencer 112 via electrical conduits 148. Electrical conduit 148 may include a first electrical conduit 148a electrically coupled to primary power supply 146a, and a second electrical conduit 148b electrically coupled to secondary power supply 146b.

In various embodiments, power supply 146 may be electrically coupled to a controller 150 of universal sequencer 112. Power supply 146 outputs a current to controller 150 and universal sequencer 112. Controller 150 may be electrically coupled to sequencer connector 130 and may output current to sequencer connector 130.

Figure 4A:
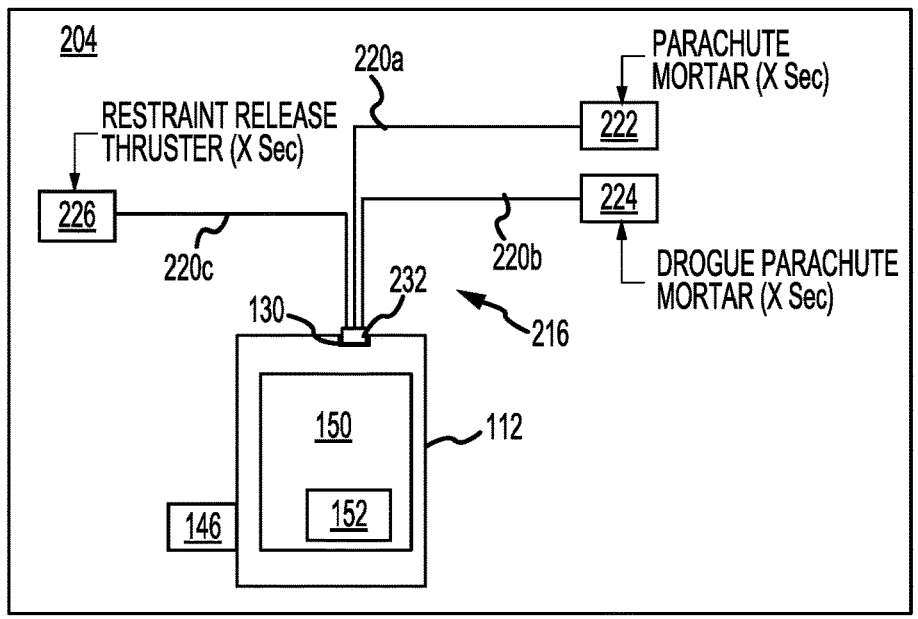
FIGS. 4A and 4B illustrate schematics of a universal sequencer electrically coupled to wire harnesses having different pin configurations, in accordance with various embodiments.

Referring to FIG. 4A, a schematic of universal sequencer 112 electrically coupled to a first wire harness 216 is illustrated, in accordance with various embodiments. First wire harness 216 is configured for use in a first ejection seat 204. First ejection seat 204 may be located in a first aircraft 202. First wire harness 216 includes a plurality of electrical conduits (e.g., first electrical conduit 220a, second electrical conduit 220b, and third electrical conduit 220c) electrically coupled to ejection subsystems of first ejection seat 204. First electrical conduit 220a may be configured to fire parachute mortar 222 in response to receiving an electrical signal from controller 150 of universal sequencer 112. Second electrical conduit 220b may be configured to fire drogue parachute mortar 224 in response to receiving an electrical signal from controller 150. Third electrical conduit 220c may be configured to fire restraint release thruster 226 in response to receiving an electrical signal from controller 150.

Harness connector 232 of first wire harness 216 is electrically coupled to sequencer connector 130 of universal sequencer 112. Harness connector 232 includes a first pin configuration. The first pin configuration may be unique to first ejection seat 204 and/or first aircraft 202. In this regard, controller 150 of universal sequencer 112 is configured to identify the model of first ejection seat 204 and/or the model of first aircraft 202 based on the pin configuration of harness connector 232.

In accordance with various embodiments, controller 150 may include and communicate with one or more processors and one or more tangible, non-transitory memories 152 and may be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or a combination thereof.

In accordance with various embodiments, controller 150 may be configured to determine an ejection sequence for the subsystems of first ejection seat 204 based on the model of first ejection seat 204 and/or on the model of first aircraft 202 (i.e., based on the pin configuration of harness connector 232). For example, controller 150 may access ejection timetables stored in memory 152.

The ejection timetables may include instructions that include predetermined time delays for each of the ejection seat subsystems. The predetermined time delays may comprise any suitable time delay based on properties of parachute mortar 222, drogue parachute mortar 224, restraint release thruster 226, first ejection seat 204, first aircraft 202, the altitude and/or airspeed at the time of ejection, or any other desired properties.

Controller 150 may determine which of the stored ejection timetables to implement for first ejection seat 204 based on the pin configuration of harness connector 232. The ejection timetable associated with first ejection seat 204 and first aircraft 202 may include the timing and/or delay schedule for firing the subsystems of first ejection seat 204. For example, the ejection timetable for first ejection seat 204 and first aircraft 202 may cause controller 150 to fire drogue parachute mortar 224 a predetermined number of seconds (or millisecond) after initiation of the ejection sequence. The ejection timetable for first ejection seat 204 and first aircraft 202 may also cause controller 150 to fire parachute mortar 222 a predetermined number of seconds (or millisecond) after initiation of the ejection sequence and/or after the firing of drogue parachute mortar 224. The ejection timetable for first ejection seat 204 and first aircraft 202 may further cause controller 150 to fire restraint release thruster 226 a predetermined number of seconds (or millisecond) after initiation of the ejection sequence and/or after the firing of parachute mortar 222.

Controller 150 is electrically coupled to power supply 146. Controller 150 may be configured to determine the ejection seat model and/or aircraft model (i.e., the pin configuration of harness connector 232), in response to receiving an electrical signal, or current, from power supply 146. In various embodiments, upon receiving an electrical signal from power supply 146, controller 150 may output an electrical signal (e.g. current) to sequencer connector 130. Controller 150 may then determine which of the pin receptacles 134 (with momentary reference to FIG. 3) of sequencer connector 130 are in an open state and which pin receptacles 134 are in a closed state. Stated differently, controller 150 is configured to determine which pin receptacles 134 have a pin 136 (with momentary reference to FIG. 3) located therein and which pin receptacles 134 are devoid of a pin 136. The pin configuration of harness connector 232 is unique to first ejection seat 204 and first aircraft 202, Thus, controller 150 may determine which ejection sequence and ejection timetable to employ based on which pin receptacles have pins located therein. For example, in various embodiments, sequencer connector 130 comprises five receptacles (e.g., receptacle A, receptacle B, receptacle C, receptacle D, and receptacle E) and harness connector 232 has a pin configuration comprised of two pins with one pin aligned with receptacle A and one pin aligned with receptacle D. When harness connector 232 is electrically coupled to sequencer connector 130, receptacles A and D are in a closed state and receptacles B, C, and E are in an open state. Based on receptacles A and D being in the closed state and receptacles B, C, and E being in the open state, controller 150 determines that first aircraft 202 is, for example, an F-15, and will perform the ejection sequence (i.e. subsystem timing) associated with an F-15.

Figure 4B:
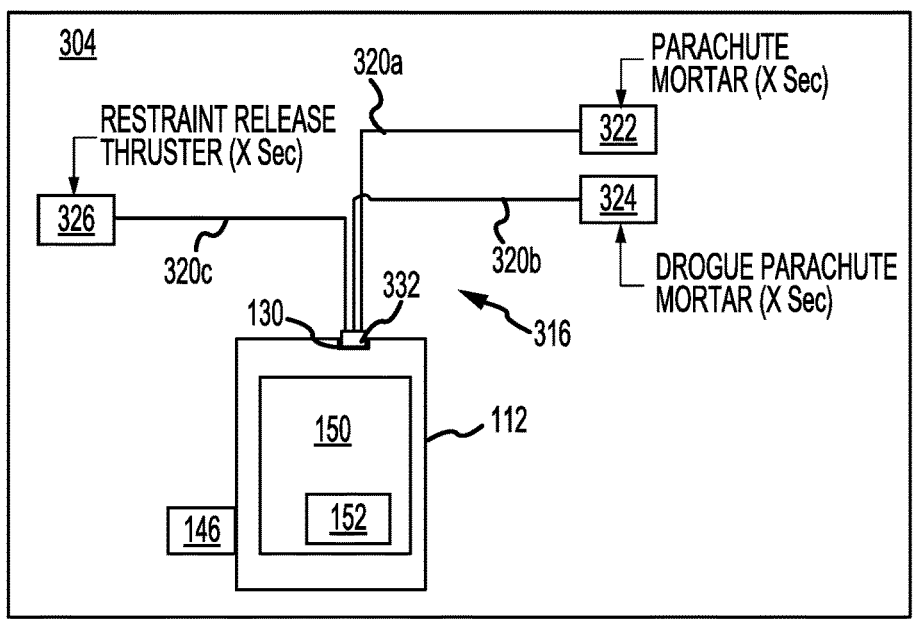

Referring to FIG. 4B, a schematic of universal sequencer 112 electrically coupled to a second wire harness 316 is illustrated, in accordance with various embodiments. Second wire harness 316 is configured for use in a second ejection seat 304. Second ejection seat 304 may be located in a second aircraft 302. Second ejection seat 304 may be a different model ejection seat as compared first ejection seat 204 of FIG. 4A. Second aircraft 302 may be a different model aircraft as compared first aircraft 202 of FIG. 4A. Universal sequencer 112 may be used with both (i.e., interchangeably with) first wire harness 216 and second wire harness 316.

Second wire harness 316 includes a plurality of electrical conduits (e.g., first electrical conduit 320a, second electrical conduit 320b, and third electrical conduit 320c) electrically coupled to ejection subsystems of second ejection seat 304. First electrical conduit 320a may be configured to fire parachute mortar 322 in response to receiving an electrical signal from controller 150 of universal sequencer 112. Second electrical conduit 320b may be configured to fire drogue parachute mortar 324 in response to receiving an electrical signal from controller 150 of universal sequencer 112. Third electrical conduit 320c may be configured to fire restraint release thruster 326 in response to receiving an electrical signal from controller 150 of universal sequencer 112. Harness connector 332 of second wire harness 316 is electrically coupled to sequencer connector 130 of universal sequencer 112. Harness connector 332 includes a second pin configuration. In various embodiments, second pin configuration is different from the first pin configuration of harness connector 232 of first wire harness 216 in FIG. 4A. The second pin configuration may be unique to second ejection seat 304 and/or second aircraft 302. In this regard, controller 150 of universal sequencer 112 is configured to identify the model of second ejection seat 304 and/or the model of second aircraft 302 based on the pin configuration of harness connector 332.

In accordance with various embodiments, controller 150 may be configured to determine an ejection sequence for the subsystems of second ejection seat 304 based on the model of second ejection seat 304 and/or on the model of second aircraft 302. For example, controller 150 may access ejection timetables stored in memory 152. Controller 150 may determine which of the stored ejection timetables to implement for second ejection seat 304 based on the pin configuration of harness connector 332. The ejection timetable associated with second ejection seat 304 and second aircraft 302 may include the timing and/or delay for firing the subsystems of second ejection seat 304. The timing and/or delays for firing the subsystems of second ejection seat 304 may be different than the timing and/or delay for firing the subsystems of first ejection seat 204 of FIG. 4A.

With combined reference to FIGS. 4A and 4B, in various embodiments, a first ejection timetable may be associated with the pin configuration of first wire harness 216 and a second ejection timetable may be associated with the pin configuration of second wire harness 316. In various embodiments, the first ejection timetable may be configured to cause drogue parachute mortar 224 of first ejection seat 204 to fire a first predetermined number of seconds after controller 150 receives a current from power supply 146. The second ejection timetable may be configured to cause drogue parachute mortar 324 of second ejection seat 304 to fire a second predetermined number of seconds after controller 150 receives a current from power supply 146. The second predetermined number of seconds may be greater than the first number of seconds.

In various embodiments, the first ejection timetable may be configured to cause parachute mortar 222 of first ejection seat 204 to fire a first predetermined number of seconds after an initiation of an ejection sequence. The second ejection timetable may be configured to cause parachute mortar 322 of second ejection seat 304 to fire a second predetermined number of seconds after the initiation of an ejection sequence. The second predetermined number of seconds may be greater than the first predetermined number of seconds.

In various embodiments, the first ejection timetable may be configured to cause restraint release thruster 226 of first ejection seat 204 to fire a first predetermined number of seconds after parachute mortar 222 is fired. The second ejection timetable may be configured to cause restraint release thruster 326 of second ejection seat 304 to fire a second predetermined number of seconds after parachute mortar 322 is fired. The second predetermined number of seconds may be greater than the first predetermined number of seconds.

The compatibility of universal sequencer 112 with wire harnesses having different pin configurations allows a single sequencer to purchased and employed in multiple ejection seats and aircraft. Reducing the number of unique parts associated with an ejection system may reduce costs. Additionally, the coupling between universal sequencer 112 and wire harness 116 allows universal sequencer 112 to be easily removed for replacement and/or testing. In the regard, universal sequencer 112 and wire harness 116 may be tested separately to ensure each component is working properly.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A universal sequencer for an ejection seat, the universal sequencer comprising:
   a sequencer connector defining a plurality of pin receptacles;
   a controller electrically coupled to the sequencer connector; and
   a tangible, non-transitory memory configured to communicate with the controller, wherein a plurality of ejection timetables is stored in the tangible, non-transitory memory accessible by the controller, with a first ejection timetable of the plurality of ejection timetables is associated with a first pin configuration of pins of a first wire harness and a second ejection timetable of the plurality of ejection timetables is associated with a second pin configuration of pins of a second wire harness and wherein the tangible, non-transitory memory having instructions stored thereon that, in response to execution by the controller, cause the controller to perform operations comprising:
      determining, by the controller, a particular model of an ejection seat within which the universal sequencer is installed, a particular model of aircraft in which the ejection seat having the universal sequencer installed therein is located, and an ejection seat location within the aircraft based on the first pin configuration of pins of a first harness connector of the first wire harness or the second pin configuration of pins of a second harness connector of the second wire harness being coupled to various ones of the plurality of pin receptacles of the sequence connector of the universal sequencer, wherein determining the particular model of the ejection seat in which the universal sequencer is installed, the particular model of aircraft in which the ejection seat having the universal sequencer installed therein is located, and the ejection seat location within the aircraft comprises:
      determining, by the controller, which pin receptacles of the plurality of pin receptacles are in an open state indicating either a pin from either the first pin configuration of pins of the first harness connector of the first wire harness or the second pin configuration of pins of the second harness connector of the second wire harness failing to be present in the various ones of the plurality of pin receptacles of the sequence connector of the universal sequencer;
      determining, by the controller, which of the pin receptacles of the plurality of pin receptacles are in a closed state indicating either a pin from either the first pin configuration of pins of the first harness connector of the first wire harness or the second pin configuration of pins of the second harness connector of the second wire harness being present in the various ones of the plurality of pin receptacles of the sequence connector of the universal sequencer; and
      determining, by the controller, the particular model of the ejection seat in which the universal sequencer is installed, the particular model of aircraft in which the ejection seat having the universal sequencer installed therein is located, and the ejection seat location within the aircraft based on which of the various ones of the plurality of pin receptacles of the sequence connector of the universal sequencer are in the open state and which of the various ones of the plurality of pin receptacles of the sequence connector of the universal sequencer are in the closed state;
      determining, by the controller, which of the first ejection timetable or the second ejection timetable to employ based on the determination of the particular model of the ejection seat the universal sequencer is installed, based on the determination of the particular model of aircraft the ejection seat having the universal sequencer installed therein is located, and based on the determination of the ejection seat location within the aircraft; and
      implementing, by the controller, either the first ejection timetable or the second ejection timetable based on the determination of which of the first ejection timetable or the second ejection timetable to employ, wherein, when the controller implements the first ejection timetable a parachute mortar fires a first number of seconds after initiation of an ejection sequence, wherein, when the controller implements the second ejection timetable the parachute mortar fires a second number of seconds after initiation of the ejection sequence, and wherein the second number of seconds is greater than the first number of seconds.

2. The universal sequencer of claim 1, further comprising a power supply electrically coupled to the controller.

3. The universal sequencer of claim 2, wherein the operations further comprise:
   receiving, by the controller, a current from the power supply; and
   outputting, by the controller, the current to the sequencer connector.

4. An ejection seat, comprising:
   a universal sequencer electrically coupled to a wire harness, the universal sequencer comprising:
      a sequencer connector engaged with a harness connector, the sequencer connector including a plurality of pin receptacles;
      a controller electrically coupled to the sequencer connector; and
      a tangible, non-transitory memory configured to communicate with the controller, wherein a plurality of ejection timetables is stored in the tangible, non-transitory memory accessible by the controller, with a first ejection timetable of the plurality of ejection timetables is associated with a first pin configuration of pins of a first wire harness and a second ejection timetable of the plurality of ejection timetables is associated with a second pin configuration of pins of a second wire harness and wherein the tangible, non-transitory memory having instructions stored thereon that, in response to execution by the controller, cause the controller to perform operations comprising:
      determining, by the controller, a particular model of the ejection seat within which the universal sequencer is installed, a particular model of aircraft in which the ejection seat having the universal sequencer installed therein is located, and an ejection seat location within the aircraft based on the first pin configuration of pins of a first harness connector of the first wire harness or the second pin configuration of pins of a second harness connector of the second wire harness being coupled to various ones of the plurality of pin receptacles of the sequence connector of the universal sequencer, wherein determining the particular model of the ejection seat in which the universal sequencer is installed, the particular model of aircraft in which the ejection seat having the universal sequencer installed therein is located, and the ejection seat location within the aircraft comprises:

determining, by the controller, which pin receptacles of the plurality of pin receptacles are in an open state indicating either a pin from either the first pin configuration of pins of the first harness connector of the first wire harness or the second pin configuration of pins of the second harness connector of the second wire harness failing to be present in the various ones of the plurality of pin receptacles of the sequence connector of the universal sequencer;

determining, by the controller, which of the pin receptacles of the plurality of pin receptacles are in a closed state indicating either a pin from either the first pin configuration of pins of the first harness connector of the first wire harness or the second pin configuration of pins of the second harness connector of the second wire harness being present in the various ones of the plurality of pin receptacles of the sequence connector of the universal sequencer; and determining, by the controller, the particular model of the ejection seat in which the universal sequencer is installed, the particular model of aircraft in which the ejection seat having the universal sequencer installed therein is located, and the ejection seat location within the aircraft based on which of the various ones of the plurality of pin receptacles of the sequence connector of the universal sequencer are in the open state and which of the various ones of the plurality of pin receptacles of the sequence connector of the universal sequencer are in the closed state;

determining, by the controller, which of the first ejection timetable or the second ejection timetable to employ based on the determination of the particular model of the ejection seat the universal sequencer is installed, based on the determination of the particular model of aircraft the ejection seat having the universal sequencer installed therein is located, and the ejection seat location within the aircraft; and implementing, by the controller, either the first ejection timetable or the second ejection timetable based on the determination of which of the first ejection timetable or the second ejection timetable to employ, wherein, when the controller implements the first ejection timetable the restraint release thruster fires a first number of seconds after a parachute mortar is fired, wherein, when the controller implements the second ejection timetable a restraint release thruster fires a second number of seconds after the parachute mortar is fired, and wherein the second number of seconds is greater than the first number of seconds.

5. The ejection seat of claim 4, further comprising:
the parachute mortar electrically coupled to a first electrical conduit of a plurality of electrical conduits; and
the restraint release thruster electrically coupled to a second electrical conduit of the plurality of electrical conduits.

6. The ejection seat of claim 4, further comprising an angular rate sensor.

7. The ejection seat of claim 4, further comprising a power supply electrically coupled to the controller, wherein the operations further comprise:
receiving, by the controller, a current from the power supply; and
outputting, by the controller, the current to the sequencer connector.

8. An assembly, comprising:
a universal sequencer configured to electrically couple to a wire harness, the universal sequencer comprising:
a sequencer connector configured to engage a harness connector, the sequencer connector including a plurality of pin receptacles;
a controller electrically coupled to the sequencer connector; and
a tangible, non-transitory memory configured to communicate with the controller, wherein a plurality of ejection timetables is stored in the tangible, non-transitory memory accessible by the controller, with a first ejection timetable of the plurality of ejection timetables is associated with a first pin configuration of pins of a first wire harness and a second ejection timetable of the plurality of ejection timetables is associated with a second pin configuration of pins of a second wire harness and wherein the tangible, non-transitory memory having instructions stored thereon that, in response to execution by the controller, cause the controller to perform operations comprising:
determining, by the controller, a particular model of an ejection seat within which the universal sequencer is installed, a particular model of aircraft in which the ejection seat having the universal sequencer installed therein is located, and an ejection seat location within the aircraft based on the first pin configuration of pins of a first harness connector of the first wire harness or the second pin configuration of pins of a second harness connector of the second wire harness being coupled to various ones of the plurality of pin receptacles of the sequence connector of the universal sequencer, wherein determining the particular model of the ejection seat in which the universal sequencer is installed, the particular model of aircraft in which the ejection seat having the universal sequencer installed therein is located, and the ejection seat location within the aircraft comprises:
determining, by the controller, which pin receptacles of the plurality of pin receptacles are in an open state indicating either a pin from either the first pin configuration of pins of the first harness connector of the first wire harness or the second pin configuration of pins of the second harness connector of the second wire harness failing to be present in the various ones of the plurality of pin receptacles of the sequence connector of the universal sequencer;
determining, by the controller, which of the pin receptacles of the plurality of pin receptacles are in a closed state indicating either a pin from either the first pin configuration of pins of the first harness connector of the first wire harness or the second pin configuration of pins of the second harness connector of the second wire harness being present in the various ones of the plurality of pin receptacles of the sequence connector of the universal sequencer; and determining, by the controller, the particular model of the ejection seat in which the universal sequencer is installed, the particular model of aircraft in which the ejection seat having the universal sequencer installed therein is located, and the ejection seat location within the aircraft based on which of the various ones of the plurality of pin receptacles of the sequence connector of the universal sequencer are in the open state and which of the various ones of the plurality of pin receptacles of the sequence connector of the universal sequencer are in the closed state;

determining, by the controller, which of the first ejection timetable or the second ejection timetable to employ based on the determination of the particular model of the ejection seat the universal sequencer is installed, based on the determination of the particular model of aircraft the ejection seat having the universal sequencer installed therein is located, and the ejection seat location within the aircraft; and implementing, by the controller, either the first ejection timetable or the second ejection timetable based on the determination of which of the first ejection timetable or the second ejection timetable to employ, wherein a first electrical conduit of a plurality of electrical conduits is configured to fire a drogue parachute mortar, wherein, when the controller implements the first ejection timetable the drogue parachute mortar fires a first number of seconds after the controller receives the current from the power supply, wherein, when the controller implements the second ejection timetable the drogue parachute mortar fires a second number of seconds after the controller receives the current from the power supply, and wherein the second number of seconds is greater than the first number of seconds.

9. The assembly of claim 8, further comprising a power supply electrically coupled to the controller.

10. The assembly of claim 9, wherein the operations further comprise:

receiving, by the controller, a current from the power supply; and outputting, by the controller, the current to the sequencer connector.

* * * * *